United States Patent
Beumler

(10) Patent No.: US 8,317,134 B2
(45) Date of Patent: Nov. 27, 2012

(54) STIFFENED CASING FOR AN AIRCRAFT OR SPACECRAFT WITH A LAMINATE STRINGER OF HIGH RIGIDITY AND CORRESPONDING LAMINATE STRINGER

(75) Inventor: Thomas Beumler, Jork (DE)

(73) Assignee: Aribus Deutschland GmbH, Hamburg (DE)

( * ) Notice: Subject to any disclaimer, the term of this patent is extended or adjusted under 35 U.S.C. 154(b) by 604 days.

(21) Appl. No.: 12/310,510

(22) PCT Filed: Nov. 2, 2007

(86) PCT No.: PCT/EP2007/061829
§ 371 (c)(1),
(2), (4) Date: Jun. 24, 2009

(87) PCT Pub. No.: WO2008/053041
PCT Pub. Date: May 8, 2008

(65) Prior Publication Data
US 2010/0148004 A1    Jun. 17, 2010

Related U.S. Application Data

(63) Continuation of application No. PCT/EP2007/061829, filed on Nov. 2, 2007.

(60) Provisional application No. 60/856,471, filed on Nov. 3, 2006.

(30) Foreign Application Priority Data

Nov. 3, 2006   (DE) .......................... 10 2006 051 989

(51) Int. Cl.
*B64C 1/00* (2006.01)

(52) U.S. Cl. ...................................................... 244/119
(58) Field of Classification Search ............. 244/117 R, 244/119, 121, 131–133, 36
See application file for complete search history.

(56) References Cited

U.S. PATENT DOCUMENTS

| | | | |
|---|---|---|---|
| 6,595,467 B2 | 7/2003 | Schmidt | |
| 6,910,661 B2* | 6/2005 | Dockter et al. | 244/218 |
| 7,195,210 B2* | 3/2007 | Hamilton et al. | 244/219 |
| 7,766,277 B2* | 8/2010 | Anderson et al. | 244/121 |
| 7,997,529 B2* | 8/2011 | Koch et al. | 244/117 R |
| 8,083,179 B2* | 12/2011 | Hamilton et al. | 244/99.8 |
| 2006/0147690 A1 | 7/2006 | Vichniakov | |

FOREIGN PATENT DOCUMENTS

| | | |
|---|---|---|
| DE | 19956394 | 2/2005 |
| IT | EP 1336469 | 8/2003 |
| RU | 2 143 365 C1 | 12/1999 |

(Continued)

OTHER PUBLICATIONS

German Office Action for DE 10 2006 051989.2 dated Jul. 7, 2008.
International Search Report for PCT/EP/2007/061829 dated Jul. 3, 2008.

(Continued)

*Primary Examiner* — Richard Price, Jr.
(74) *Attorney, Agent, or Firm* — Jenkins, Wilson, Taylor & Hunt, P.A.

(57) ABSTRACT

The present invention provides a casing structure of low weight provided with a laminate stringer of high rigidity. The stringer has the form of a laminate with a plurality of metallic layers and at least one synthetic fiber layer, which is produced at least partially from Zylon fibers, provided between two metallic layers.

6 Claims, 4 Drawing Sheets

FOREIGN PATENT DOCUMENTS

| | | |
|---|---|---|
| RU | 2 271 304 C2 | 3/2006 |
| RU | 2271304 C2 | 3/2006 |
| WO | WO 94/01277 | 1/1994 |
| WO | WO2004/071761 | 8/2004 |
| WO | WO2005/110736 | 11/2005 |
| WO | WO2007/061304 | 5/2007 |
| WO | WO2007/145512 | 12/2007 |
| WO | WO2008/033017 | 3/2008 |
| WO | WO2008/053041 | 5/2008 |

OTHER PUBLICATIONS

Decision to Grant for International Application No. 2009119050/11(026224) dated Apr. 4, 2011.

* cited by examiner

STIFFENED CASING FOR AN AIRCRAFT OR SPACECRAFT WITH A LAMINATE STRINGER OF HIGH RIGIDITY AND CORRESPONDING LAMINATE STRINGER

This application is a CON of PCT/EP2007/061829 Nov. 2, 2007 which claims benefit of 60/856,471 Nov. 3, 2006.

FIELD OF THE INVENTION

The present invention relates to a casing for an aircraft or spacecraft with a laminate stringer of high rigidity and to a corresponding laminate stringer.

Although it can be applied to any structures, the present invention and the challenge on which it is based are explained in more detail with reference to a fuselage part of an aircraft fuselage made up of a number of fuselage parts.

BACKGROUND OF THE INVENTION

FIG. 3 schematically shows a rear fuselage part A of such an aircraft fuselage F, made up of a number of fuselage parts, to explain the general problem.

The rear fuselage part A, shown in FIG. 3, of the aircraft fuselage F is delimited in the direction of the end of the fuselage by the pressure dome 1, which is curved towards the rear. The fuselage part A comprises six segments, which together form a cylinder.

Reference numeral 2 designates a floor, which is fitted on corresponding transverse beams 2a. The outer skin or casing 5 is fitted on annular frames 3. To stiffen the skin of the fuselage, stringers 4 are provided between the frames 3, and these stringers 4 connected to the outer skin 5, for example by adhesive bonding or riveting.

The stringers 4 are usually Z-, L- or I-shaped longitudinal stiffening elements, which provide a second load path in the event of a damaged skin (large damage capability). The stringers 4 run perpendicularly in relation to the frames and consequently parallel to the longitudinal axis of the aircraft. The stringers 4 are conventionally produced from an aluminium alloy.

Recently, a change has taken place in favour of using fibre-metal laminate structures (FML) for the outer skin 5 instead of the original technique of producing it from monolithic aluminium structures. Examples of such laminates are disclosed by WO 94/01277.

GLARE® is a laminate-like material combination that comprises a plurality of layers, each only a few tenths of a millimeter thick. These layers alternately consist of aluminium and a glass fibre laminate and are adhesively bonded under pressure. The word GLARE is an acronym for "Glass Fibre Reinforced Aluminium". It was developed especially for aircraft construction and used for the first time over a large area in the AIRBUS A 380, in which large parts of the upper outer skin consist of GLARE. The advantages over aluminium are, in particular, its high damage tolerance, low density and good fire endurance. Fatigue cracks are bridged by the glass fibre layers, so that the crack propagation rate remains constantly low, irrespective of the length of crack, whereas in the case of aluminium the crack propagation rate increases sharply.

The density of GLARE is 9.5% to 13% below that of the aluminium customary in aircraft construction. In the case of GLARE, the glass fibres usually make up about 30% of the laminate. Since it is possible on account of the special properties of GLARE to reduce the skin thickness of the outer skin 5, i.e. to reduce the cross-sectional area of the outer skin 5, GLARE brings with it a considerable weight saving potential.

A disadvantage of GLARE is the reduced modulus of elasticity, which is around 57 GPa, in comparison with 70 GPa for aluminium. On account of the lower rigidity, there may be a shift in load from the GLARE components to other, neighbouring components. As a result, a weight advantage of the GLARE structure may be offset by a weight disadvantage of the surrounding structure. This is essentially the case for the fuselage structure over the centre-wing box, since the centre-wing box itself has a higher rigidity.

EP 1 336 469 A1 discloses a stringer for an aircraft or spacecraft that has an FML structure.

SUMMARY OF THE INVENTION

The object of the present invention is to provide a casing or fuselage structure with which the advantages of the GLARE skin can be fully exploited, i.e. without any load shift.

The invention provides an FML stringer of high rigidity for aircraft or spacecraft with the features of patent Claim 1 and a fuselage structure containing said stringer according to Claim 6.

The idea on which the present invention is based is to combine a fibre-metal laminate outer skin, for example comprising GLARE, with special stringers or struts of a higher modulus of elasticity. In particular, the invention proposes using shaped fibre-metal laminate stringers (for example in the form of a Z) incorporating Zylon fibres. These fibres give the stringers a modulus of elasticity of the order of magnitude of 90-98 GPa. The Zylon fibre stringers are commercially available as blank sheets to which all conventional forming methods can be applied. The aforementioned skin/stringer combination avoids load shifts with the otherwise customary weight saving of FML structures of the order of magnitude of 15% to 20%.

Advantageous refinements, developments and improvements of the invention can be found in the subclaims.

According to a preferred development, the stringer has a Z shape.

According to a further preferred development, the stringer has a modulus of elasticity of between 90 and 100 GPa.

According to a further preferred development, the stringer has a first straight side portion, a middle region and a second straight side portion, which merge with one another by means of arcs of a circle.

According to a further preferred development, the plurality of metallic layers are produced from aluminium or an aluminium compound or an aluminium alloy.

BRIEF DESCRIPTION OF THE DRAWINGS

The invention is explained in more detail below on the basis of exemplary embodiments with reference to the accompanying figures of the drawings, in which.

DESCRIPTION OF THE PREFERRED EMBODIMENTS

Figure 1A:
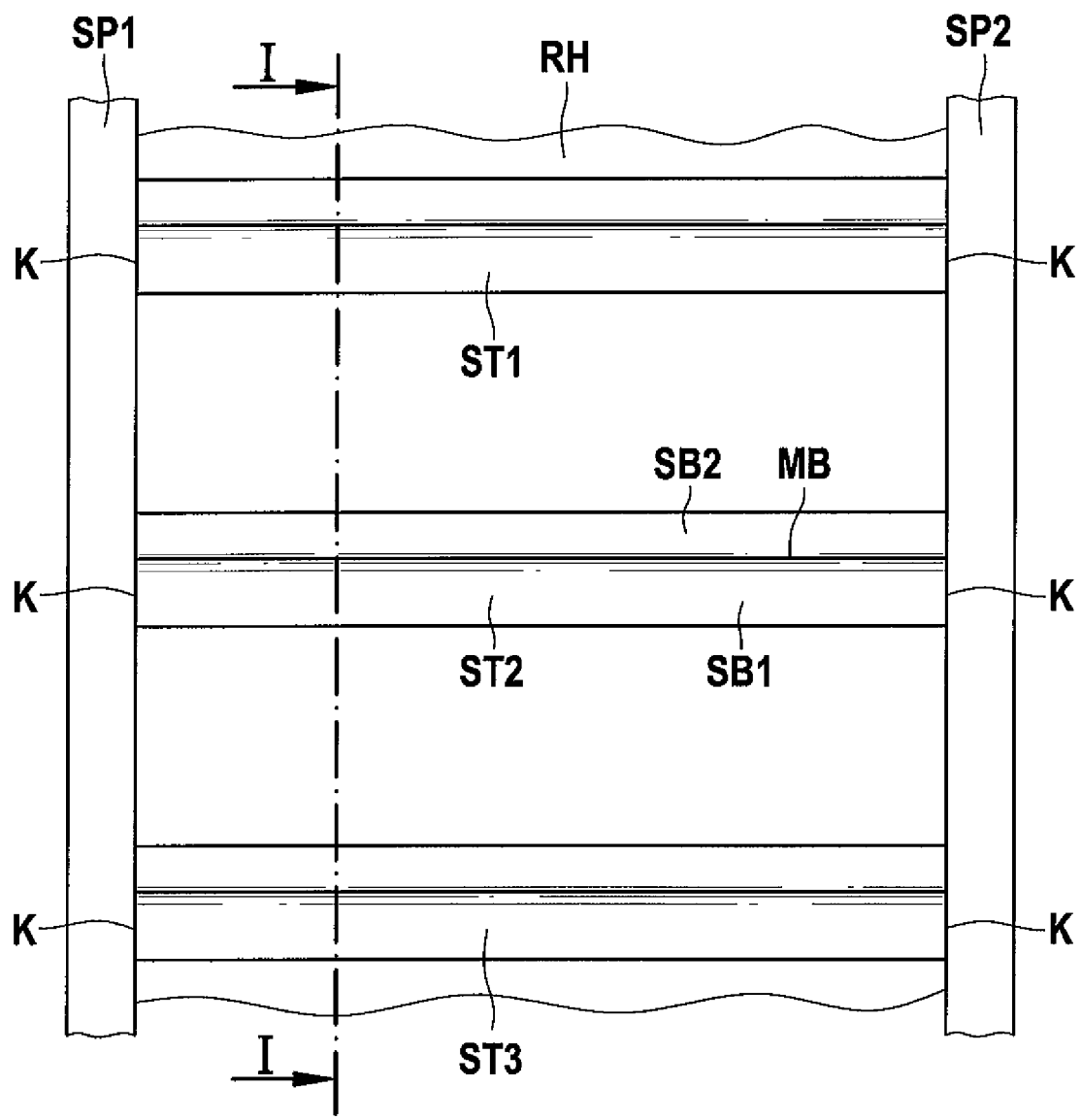
FIG. 1a shows a schematic plan view of a fuselage structure according to an exemplary embodiment of the invention.

In the figures, the same reference numerals designate components that are the same or functionally the same.

Figure 1B:
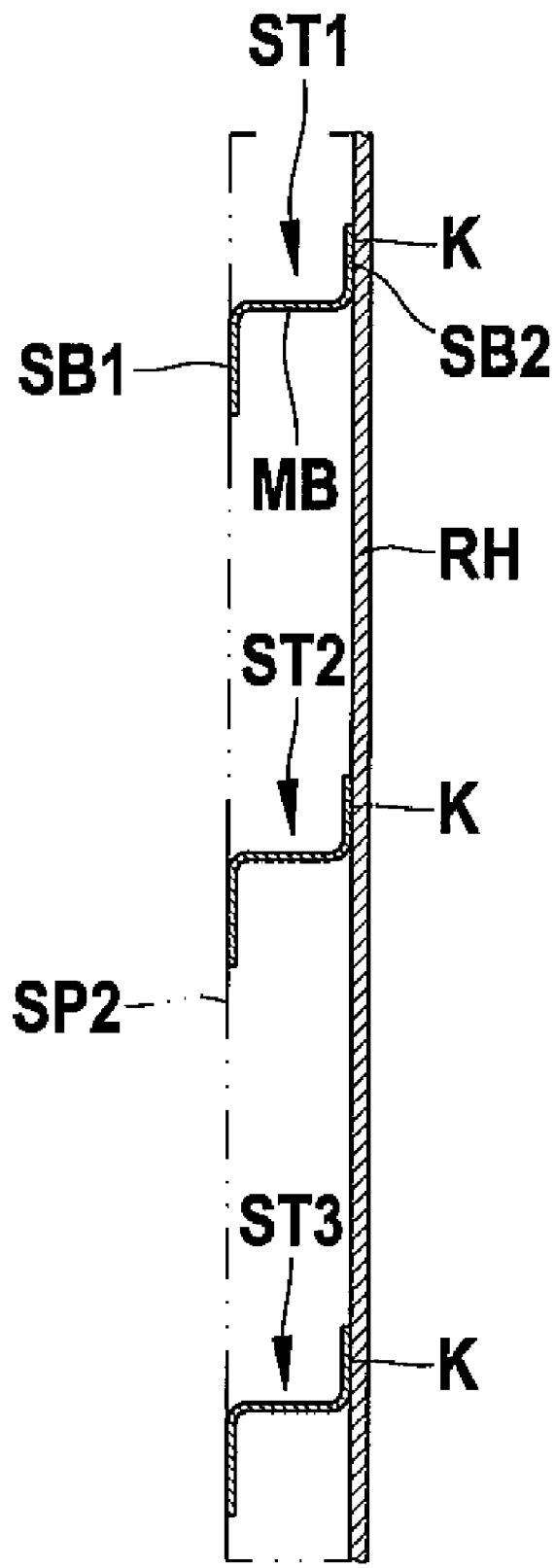
FIG. 1b shows a section along the line I-I in FIG. 1.
Figure 2:
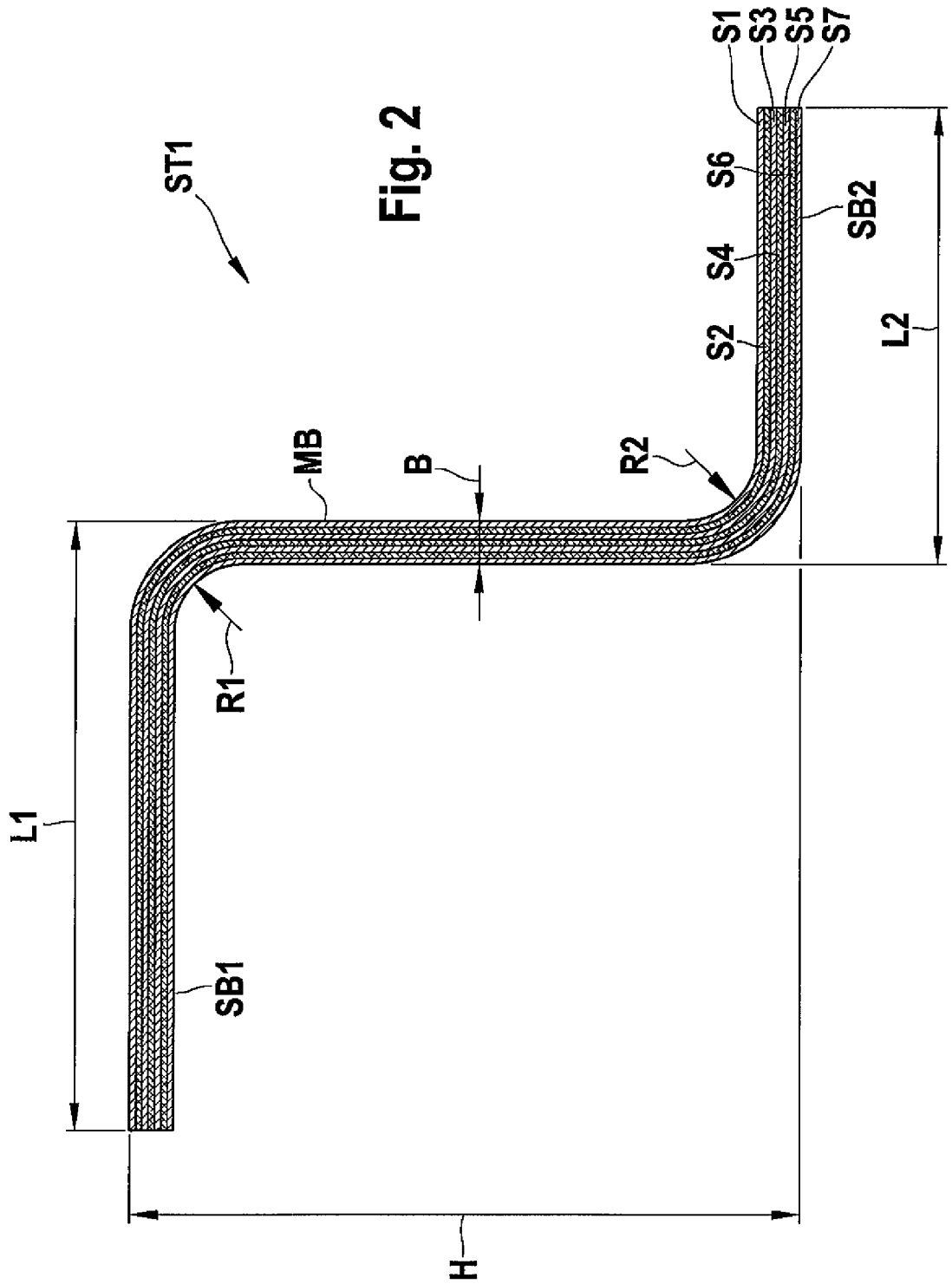
FIG. 2 shows a stringer of the structure according to FIGS. 1a,b.
Figure 3:
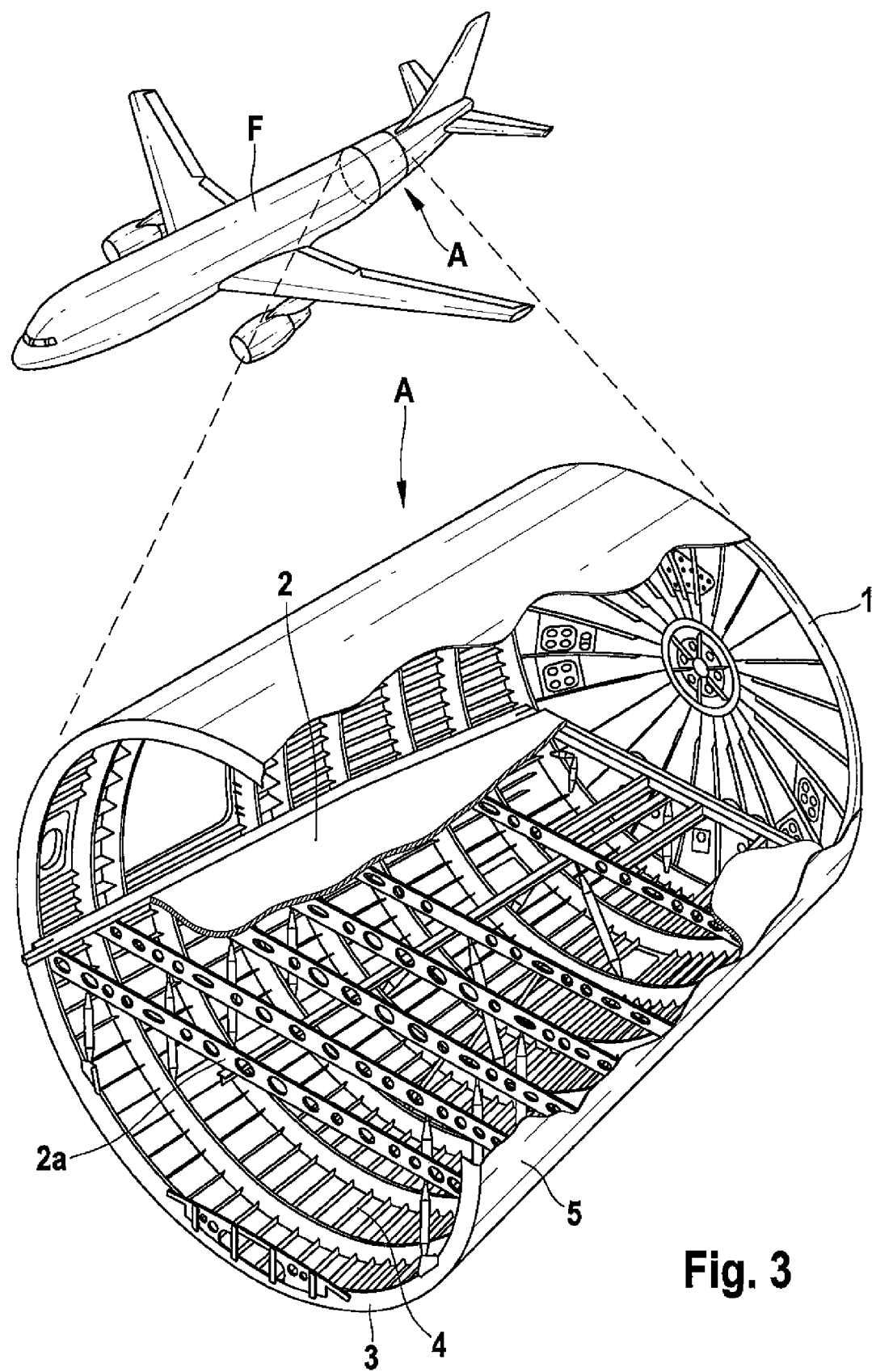
FIG. 3 schematically shows a rear fuselage part of an aircraft fuselage, made up of a number of fuselage parts, to explain the general problem.

FIG. 1*a* shows a schematic plan view of a fuselage structure according to an exemplary embodiment of the invention and FIG. 1*b* shows a section along line I-I in FIG. 1, and FIG. 2 shows a stringer of the structure according to FIGS. 1*a,b*.

In FIG. 1, reference numerals SP1, SP2 designate a first and second frame of a fuselage structure of an aircraft, provided between which are stringers ST1, ST2, ST3, which are adhesively bonded both to the frames SP1, SP2 and to the outer skin RH of GLARE at adhesive surfaces K.

The stringers ST1, ST2, ST3 have an upright Z-shaped profile, as can be seen from the section in FIG. 1*b* and FIG. 2. In particular, the stringers ST1, ST2, ST3 have a first straight side portion SB1, a middle region MB and a second straight side portion SB2, which merge with one another by means of arcs of a quarter circle with radii R1 and R2, respectively. The radii R1, R2 are preferably 45 mm, the height H 38 mm, the thickness B 2.35 mm, the length L1 34 mm and the length L2 25 nm.

The stringers ST1, ST2, ST3 are not connected to the frames SP1, SP2 but to the outer skin RH, by adhesive bonding. As can be seen from FIG. 1*b*, the respective shorter side portion SB2 is adhesively bonded to the outer skin RH.

The stringers ST1, ST2, ST3 comprise an aluminium/Zylon fibre laminate, the layers S1, S3, S5, S7 being aluminium layers and the layers S2, S4, S6 being Zylon fibre layers. Zylon is a synthetic fibre and has a high tear strength with likewise high elasticity. Zylon only burns if the surroundings have an artificially produced oxygen content of over 68%. The melting temperature is reached at about 650° C. Zylon consists of solid rod-shaped chain molecules of poly(p-phenylene-2,6-benzobisoxazole), also referred to as PBO.

The company GTM is developing a fibre-metal laminate with Zylon fibres, comprising layers of aluminium and layers of Zylon fibres, that is suitable for the stringers ST1, ST2, ST3. The material must be stretched after curing in an autoclave and can therefore be produced in a unidirectionally fibre-reinforced form.

The replacement of a conventional aluminium stringer by this Zylon fibre stringer with a modulus of elasticity E of around 94 GPa brings with it a weight saving of 13.8% for the same stiffness in comparison with the aluminium structure. If the fibre content in the Zylon fibre stringer is increased, the modulus of elasticity is increased to around 98 GPa and the weight saving potential is increased to 15.7%.

Although the present invention has been described here on the basis of preferred exemplary embodiments, it is not restricted to them but can be modified in various ways.

In particular, the geometric shape and the number of layers of the stringer and also the manner of installation shown are only given by way of example and can be varied application-specifically.

Instead of adhesive bonding of the stringers, for example, riveting is also possible.

The invention claimed is:

1. Fuselage structure, in particular of an aircraft or a spacecraft, wherein a plurality of stringers is provided between a first and second frame on which frames an outer skin is fitted; wherein each of said plurality of stringers is adhesively bonded both to the first and second frame and to the outer skin at respective adhesive surfaces; wherein each of said stringers comprises a plurality of metallic layers and a respective synthetic fibre layer between each two metallic layers, which synthetic fibre layer is produced at least partially from poly(p-phenylene-2,6-benzobisoxazole) fibres.

2. Fuselage structure of claim 1 wherein said stringers have a Z shape including a first straight side portion, a middle region and a second straight side portion, which merge with one another by means of arcs of a circle; and wherein the respective second straight side portion is adhesively bonded to the outer skin.

3. Fuselage structure of claim 2, wherein said second straight side portion is shorter than said first straight side portion.

4. Fuselage structure of claim 1, wherein said stringers have a modulus of elasticity of between 90 and 100 GPa.

5. Fuselage structure of claim 1, wherein each of the plurality of metallic layers is produced from aluminum or an aluminum compound or an aluminum alloy.

6. Fuselage structure of claim 1, wherein the outer skin is produced from a laminate-like material combination that comprises a plurality of layers, which layers alternately consist of aluminum and a glass fibre laminate and are adhesively bonded.

* * * * *

UNITED STATES PATENT AND TRADEMARK OFFICE
CERTIFICATE OF CORRECTION

PATENT NO. : 8,317,134 B2  
APPLICATION NO. : 12/310510  
DATED : November 27, 2012  
INVENTOR(S) : Thomas Beumler Page 1 of 1

It is certified that error appears in the above-identified patent and that said Letters Patent is hereby corrected as shown below:

On title page, item (73) Assignee
replace "Aribus"
with --Airbus--.

Signed and Sealed this
Nineteenth Day of February, 2013

Teresa Stanek Rea
*Acting Director of the United States Patent and Trademark Office*